(12) United States Patent
Tian et al.

(10) Patent No.: US 10,863,539 B2
(45) Date of Patent: Dec. 8, 2020

(54) TRANSMISSION OPPORTUNITY TRUNCATION

(71) Applicant: Qualcomm Incorporated, San Diego, CA (US)

(72) Inventors: Qingjiang Tian, San Diego, CA (US); Gwendolyn Denise Barriac, Encinitas, CA (US); Abhishek Pramod Patil, San Diego, CA (US); Yan Zhou, San Diego, CA (US); George Cherian, San Diego, CA (US); Alfred Asterjadhi, San Diego, CA (US); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 15/684,898

(22) Filed: Aug. 23, 2017

(65) Prior Publication Data

US 2018/0084579 A1  Mar. 22, 2018

Related U.S. Application Data

(60) Provisional application No. 62/398,273, filed on Sep. 22, 2016.

(51) Int. Cl.
*H04W 74/00* (2009.01)
*H04W 74/06* (2009.01)
(Continued)

(52) U.S. Cl.
CPC ........ *H04W 74/008* (2013.01); *H04W 74/06* (2013.01); *H04W 74/0816* (2013.01);
(Continued)

(58) Field of Classification Search
CPC .................................................. H04W 74/008
See application file for complete search history.

(56) References Cited

U.S. PATENT DOCUMENTS 8,259,828 B2   9/2012   Fu et al.
8,355,468 B2   1/2013   Ro et al.
(Continued)

FOREIGN PATENT DOCUMENTS

WO   WO-2017078801 A1   5/2017

OTHER PUBLICATIONS

ISA/EP, International Search Report and Written Opinion of the International Searching Authority, Int'l Application No. PCT/US2017/048353, dated Nov. 6, 2017, European Patent Office, Rijswijk, NL, 13 pgs.

*Primary Examiner* — Andrew Lai
*Assistant Examiner* — Andrew C Lee
(74) *Attorney, Agent, or Firm* — Steven R. Thiel

(57) ABSTRACT

This disclosure provides systems, methods, and apparatus, including computer programs encoded on computer storage media, for improving transmission opportunity (TxOP) truncation in wireless communication. In some implementations, a transmit opportunity (TxOP) period truncation or whether to update a network allocation vector (NAV) timing based on a message that includes transmitter and receiver information (such as a transmitter address (TA) and a receiver address (RA)) may be determined. For example, a station may receive a contention-free end (CF-End) frame and determine a TxOP period truncation based on comparing a TA and an RA included in the CF-End frame with a TA and an RA included in an earlier received message (e.g., an RTS). Such information may be compared to other TAs or
(Continued)

RAs associated with NAV timing values and the NAV timing may be set, reset, updated, or canceled based on the comparison.

26 Claims, 12 Drawing Sheets

(51) Int. Cl.
 H04W 74/08 (2009.01)
 H04W 16/14 (2009.01)
 H04W 56/00 (2009.01)
(52) U.S. Cl.
 CPC ........ *H04W 16/14* (2013.01); *H04W 56/0045* (2013.01); *H04W 74/002* (2013.01)

(56) References Cited

U.S. PATENT DOCUMENTS

| | | | |
|---|---|---|---|
| 9,363,707 B2 * | 6/2016 | Merlin | H04W 28/065 |
| 9,462,562 B2 | 10/2016 | Chakraborty et al. | |
| 9,781,627 B2 * | 10/2017 | Merlin | H04L 1/0073 |
| 10,420,148 B2 * | 9/2019 | Adachi | H04L 5/0055 |
| 2007/0115882 A1 | 5/2007 | Wentink | |
| 2007/0171858 A1 * | 7/2007 | Grandhi | H04W 72/1278 |
| | | | 370/328 |
| 2007/0230408 A1 * | 10/2007 | Trainin | H04W 72/1268 |
| | | | 370/338 |
| 2010/0135268 A1 * | 6/2010 | Seok | H04W 74/0816 |
| | | | 370/338 |
| 2011/0305156 A1 * | 12/2011 | Liu | H04L 47/50 |
| | | | 370/252 |
| 2012/0327870 A1 | 12/2012 | Grandhi et al. | |
| 2013/0329721 A1 | 12/2013 | Doetsch et al. | |
| 2013/0336182 A1 * | 12/2013 | Asterjadhi | H04L 69/22 |
| | | | 370/310 |
| 2014/0376519 A1 * | 12/2014 | Yang | H04L 61/6022 |
| | | | 370/336 |
| 2015/0092652 A1 * | 4/2015 | Ramamurthy | H04L 1/1614 |
| | | | 370/312 |
| 2015/0244619 A1 * | 8/2015 | Zheng | H04W 40/34 |
| | | | 370/392 |
| 2015/0249529 A1 * | 9/2015 | Zheng | H04L 1/1896 |
| | | | 370/336 |
| 2015/0341153 A1 | 11/2015 | Jongren et al. | |
| 2015/0358067 A1 * | 12/2015 | Zhang | H04W 52/0216 |
| | | | 370/315 |
| 2016/0088555 A1 | 3/2016 | Trainin et al. | |
| 2016/0244619 A1 * | 8/2016 | Backer | C09D 123/0876 |
| 2016/0330788 A1 * | 11/2016 | Zheng | H04W 76/27 |
| 2016/0345349 A1 * | 11/2016 | Ferdowsi | H04W 72/1268 |
| 2017/0026151 A1 * | 1/2017 | Adachi | H04W 72/0453 |
| 2017/0064708 A1 * | 3/2017 | Noh | H04L 5/0023 |
| 2017/0104565 A1 * | 4/2017 | Seok | H04L 27/2602 |
| 2017/0127428 A1 * | 5/2017 | Adachi | H04L 5/0053 |
| 2017/0127453 A1 * | 5/2017 | Adachi | H04L 69/28 |
| 2017/0201298 A1 * | 7/2017 | Cariou | H04W 72/048 |
| 2017/0295560 A1 * | 10/2017 | Kim | H04L 5/0055 |
| 2018/0063824 A1 * | 3/2018 | Kim | H04W 84/12 |
| 2018/0098352 A1 * | 4/2018 | Kim | H04W 74/04 |
| 2018/0115947 A1 * | 4/2018 | Kim | H04W 52/0216 |
| 2018/0124746 A1 * | 5/2018 | Choi | H04W 72/04 |
| 2018/0176865 A1 * | 6/2018 | Kim | H04W 52/0229 |
| 2018/0213558 A1 * | 7/2018 | Kim | H04W 74/006 |
| 2018/0343096 A1 * | 11/2018 | Kim | H04W 52/243 |

* cited by examiner

TRANSMISSION OPPORTUNITY TRUNCATION

CROSS REFERENCE TO RELATED APPLICATIONS

This patent application claims priority to U.S. Provisional Patent Application No. 62/398,273 filed Sep. 22, 2016 entitled "Improving Transmission Opportunity Truncation," and assigned to the assignee hereof. The disclosure of the prior application is incorporated by reference in this patent application.

TECHNICAL FIELD

This disclosure relates generally to wireless communication, and more specifically to improving transmission opportunity truncation.

DESCRIPTION OF THE RELATED TECHNOLOGY

Wireless communications systems are widely deployed to provide various types of communication content such as voice, video, packet data, messaging, broadcast, and so on. These systems may be multiple-access systems capable of supporting communication with multiple users by sharing the available system resources (such as time, frequency, and power). A wireless network, for example a wireless local area network (WLAN), such as a Wi-Fi (i.e., Institute of Electrical and Electronics Engineers (IEEE) 802.11) network, may include an access point (AP) that communicates with one or more stations (STAs) or mobile devices. The AP may be coupled to a network, such as the Internet, and may enable a mobile device to communicate via the network (or communicate with other devices coupled to the AP). A wireless device may communicate with a network device bi-directionally. For example, in a WLAN, a STA may communicate with an associated AP via downlink (DL) and uplink (UL). The DL (or forward link) may refer to the communication link from the AP to the STA, and the UL (or reverse link) may refer to the communication link from the STA to the AP.

Some wireless networks allow communication for multiple devices using a channel access procedure. One such channel access procedure is contention-based where multiple devices contend for access to a medium of the wireless networks by requesting access to the medium. Some of the devices may gain access to the medium and are allocated specific resources for a duration of time, which may be referred to as a Transmit Opportunity (TxOP). The TxOP may be obtained by one or more devices of the network and once obtained, a device may communicate packets throughout the TxOP duration. The device(s) that did not gain access to the medium may wait until a next contention period in order to again contend for access to a medium.

To determine how long to wait before contending, some devices may utilize a network allocation vector (NAV) timing that indicates how much time is allocated to the device(s) that gained access to the medium. The NAV timing may be updated after receiving a message (such as from an AP, a STA, or any other mobile device) containing a duration for which the sending device expects to the medium to be utilized. Examples of such messages may include a data message sent by a STA or an AP or a clear to send (CTS) message received during a request to send (RTS) procedure, among others. In some cases, a device that has gained access to the medium may end a TxOP duration early (i.e., TxOP truncation) by sending a contention-free end (CF-End) message indicating that the device does not expect to occupy the medium any longer (even though there may still be time remaining in the TxOP duration). In such instances, however, the CF-End message may be received by a STA for which the message was not intended, and that STA may reset its NAV timing even though the CF-End message should not have been considered by that STA. This may lead to the STA contending for access to a medium early and may result in interference or packet loss.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication. In some implementations, the method can include receiving a first message from a first STA at a second STA, the first message including a first NAV, a first transmitter address (TA), and a first receiver address (RA), receiving, at the second STA, a CF-End frame including a second TA and a second RA, determining a TxOP period truncation in response to the received CF-End frame based at least in part on a comparison between the first TA, the second TA, the first RA, and the second RA, and contending for access to a wireless medium based at least in part on the determined TxOP period truncation.

Another innovative aspect of the subject matter described in this disclosure can be implemented in an apparatus for wireless communication. In some implementations, the apparatus can include means for receiving a first message from a first STA at a second STA, the first message including a first NAV, a first TA, and a first RA, means for receiving, at the second STA, a CF-End frame including a second TA and a second RA, means for determining a TxOP period truncation in response to the received CF-End frame based at least in part on a comparison between the first TA, the second TA, the first RA, and the second RA, and means for contending for access to a wireless medium based at least in part on the determined TxOP period truncation.

Another innovative aspect of the subject matter described in this disclosure can be implemented in another apparatus for wireless communication. The apparatus can include a processor, memory in electronic communication with the processor, and instructions stored in the memory. The instructions can be operable to cause the processor to receive a first message from a first STA at a second STA, the first message including a first NAV, a first TA, and a first RA, receive, at the second STA, a CF-End frame including a second TA and a second RA, determine a TxOP period truncation in response to the received CF-End frame based at least in part on a comparison between the first TA, the second TA, the first RA, and the second RA, and contend for access to a wireless medium based at least in part on the determined TxOP period truncation.

Another innovative aspect of the subject matter described in this disclosure can be implemented in a non-transitory computer readable medium for wireless communication. The non-transitory computer-readable medium may include instructions operable to cause a processor to receive a first message from a first STA at a second STA, the first message including a first NAV, a first TA, and a first RA, receive, at the second STA, a CF-End frame including a second TA and a second RA, determine a TxOP period truncation in response to the received CF-End frame based at least in part on a comparison between the first TA, the second TA, the first RA, and the second RA, and contend for access to a wireless medium based at least in part on the determined TxOP period truncation.

In some implementations, the method, apparatus, and non-transitory computer-readable medium can include storing, by the second STA, a data structure associating the first NAV with the first TA and the first RA. In some implementations, the method, apparatus, and non-transitory computer-readable medium can include updating the data structure to associate a NAV timing with the first TA and the first RA based at least in part on the determined TxOP period truncation.

In some implementations, the method, apparatus, and non-transitory computer-readable medium can include storing, by the second STA, a history of NAV timing updates. In some implementations, the method, apparatus, and non-transitory computer-readable medium can include updating the history of NAV timing updates based at least in part on the determined TxOP period truncation.

In some implementations, the method, apparatus, and non-transitory computer-readable medium can include determining the TxOP period truncation based at least in part on the first TA matching the second TA or the second RA.

In some implementations, the method, apparatus, and non-transitory computer-readable medium can include determining the TxOP period truncation based at least in part on the first RA matching the second TA or the second RA.

In some implementations of the method, apparatus, and non-transitory computer-readable medium described above, the first message includes a request to send (RTS) message.

In some implementations, the method, apparatus, and non-transitory computer-readable medium can include transmitting a clear to send (CTS) message in response to the RTS message.

In some implementations of the method, apparatus, and non-transitory computer-readable medium described above, the CF-End frame may be received from a third station or an access point.

BRIEF DESCRIPTION OF THE DRAWINGS

Like reference numbers and designations in the various drawings indicate like elements.

DETAILED DESCRIPTION

Figure 1:
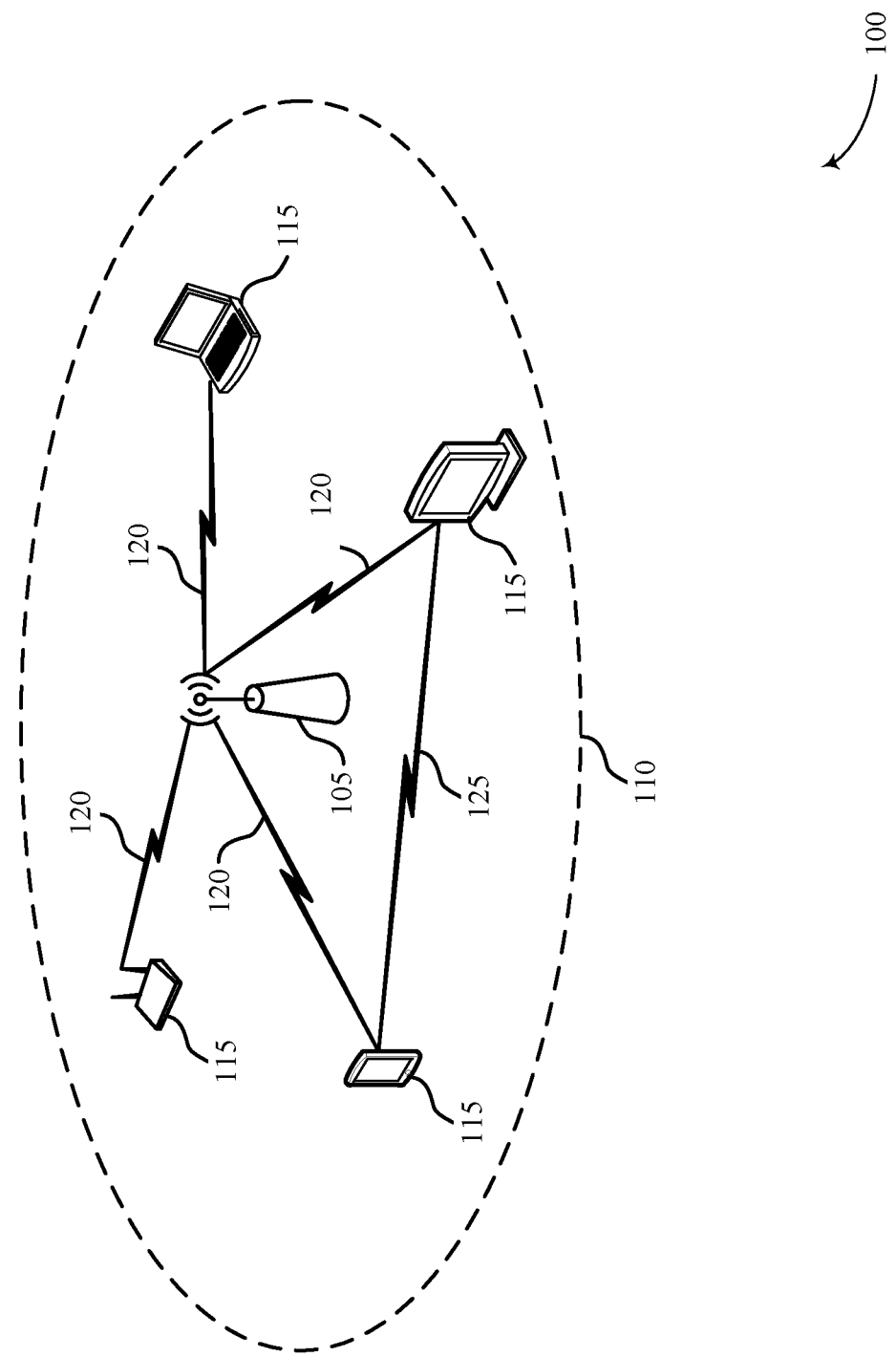
FIG. 1 illustrates an example of a system for wireless communication.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

The described techniques relate to improved methods, systems, devices, or apparatuses that support improving transmission opportunity truncation. Generally, the described techniques provide a device in a wireless network with the capability of determining whether updating a network allocation vector (NAV) timing is appropriate. By associating a transmitter address (TA) or a receiver address (RA) with a corresponding NAV value, a device may determine whether to update or reset a NAV timing based on a comparison between the associated TA or RA with a TA or RA received in a message such as a contention-free end (CF-End) message (e.g., CF-End frame). In some implementations, a device may associate a NAV timing with a basic service set (BSS) to which the device is connected, which may be referred to as an Intra-BSS NAV. The device also may associate a NAV timing with another BSS, such as an overlapping BSS (OBSS), which may be referred to as an Inter-BSS NAV. Based on whether messages are sent from a device within a BSS or an OBSS, the receiving device may decide on whether to update the Intra-BSS NAV or the Inter-BSS NAV.

A wireless communications system may include a wireless local area network (WLAN) having multiple devices in communication with one another. For example, a WLAN may include an access point (AP) in communication with one or more stations (STAs) and two or more STAs may be in communication with each other, either directly or via the AP. A WLAN may operate using a channel access procedure, in which devices may request access to a medium of the WLAN by sending a request to send (RTS) message. In response, an AP or other STA may send a clear to send (CTS) message to one or more devices that have obtained a transmit opportunity (TxOP) and are allowed access to the medium for a TxOP duration. Devices that have not gained access to the medium may update associated NAV timings based on an RA or a TA contained within the RTS or CTS message.

Particular implementations of the subject matter described in this disclosure can be implemented to realize one or more of the following potential advantages. The implementations may associate an RA or a TA with a NAV value to compare with an RA or a TA included in a received message before determining to update a NAV timing. By considering (e.g., monitoring, tracking, or storing) RAs or TAs and associated NAV values, interference and collisions may be avoided that would otherwise occur due to TxOP truncation. STAs also may choose to reuse resources depending on whether a received transmission is from an AP within a BSS to which the STA is connected. For example, a first BSS may communicate using a portion of frequency or time resources that are the same as a neighboring BSS even if the neighboring BSS is communicating.

In some cases, a STA that has not gained access to the medium may update, set, or cancel a NAV timing corresponding with a BSS to which the STA is connected (referred to as Intra-BSS NAV) or update, set, or cancel a NAV timing corresponding with an OBSS to which the STA is not connected (referred to as Inter-BSS NAV). To determine whether to update the Intra-BSS NAV or Inter-BSS NAV, the STA may compare a TA or an RA received in a message (such as a CF-End message) with a TA or an RA associated with an Intra-BSS NAV or Inter-BSS NAV. In some cases, this may involve the STA associating a TA and an RA with an Intra-BSS NAV or Inter-BSS NAV and comparing the associated TA or RA with a TA or RA contained within a received CF-End message.

As the NAV timing may be updated several times before being reset or canceled, the STA also may store a history of the NAV timing updates, which may include an RA or TA that most recently updated the NAV timing, and also may include whether the NAV timing update is for an Intra-BSS NAV or an Inter-BSS NAV. In other implementations, a STA may store a complete history of every TA or RA contained within received messages along with an associated NAV timing. In such implementations, the STA may determine an Inter-BSS NAV or an Intra-BSS NAV as the maximum NAV timing for each of the Inter-BSS NAV and the Intra-BSS NAV.

FIG. 1 illustrates an example of a system for wireless communication such as a WLAN 100 (also known as a Wi-Fi network). The WLAN 100 may include an AP 105 and multiple associated STAs 115, which may represent devices such as mobile stations, personal digital assistants (PDAs), other handheld devices, netbooks, notebook computers, tablet computers, laptops, display devices (such as TVs, computer monitors, etc.), watches, printers, etc. The AP 105 and the associated STAs 115 may represent a BSS or an extended service set (ESS). The various STAs 115 in the network are able to communicate with one another through the AP 105. Also shown is a coverage area 110 of the AP 105, which may represent a basic service area (BSA) of the WLAN 100. An extended network STA (not shown) associated with the WLAN 100 may be connected to a wired or wireless distribution system that may allow multiple APs 105 to be connected in an ESS.

Although not shown in FIG. 1, a STA 115 may be in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (such as metropolitan area, home network, etc.), with varying and overlapping coverage areas 110. Two STAs 115 also may communicate directly via a direct wireless link 125 regardless of whether both STAs 115 are in the same coverage area 110. Examples of direct wireless links 125 may include Wi-Fi Direct connections, Wi-Fi Tunneled Direct Link Setup (TDLS) links, and other group connections. STAs 115 and APs 105 may communicate according to the WLAN radio and baseband protocol for physical and media access control (MAC) layers from IEEE 802.11 and versions including, but not limited to, 802.11b, 802.11g, 802.11a, 802.11n, 802.11ac, 802.11ad, 802.11ah, 802.11ax, and any other IEEE 802.11 standards. In some other implementations, peer-to-peer connections or ad hoc networks may be implemented within WLAN 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (such as carrier sense multiple access with collision avoidance (CSMA/CA)) because the STAs 115 may not refrain from transmitting on top of each other. A STA 115 whose transmissions are not identifiable, but that is within the same coverage area 110 may be known as a hidden node. CSMA/CA may be supplemented by the exchange of an RTS packet transmitted by a sending STA 115 (or AP 105) and a CTS packet transmitted by the receiving STA 115 (or AP 105). This may alert other devices within range of the sender and receiver not to transmit for the duration of the primary transmission. Thus, RTS/CTS may help mitigate a hidden node problem.

In some implementations, STAs 115 and AP 105 utilize techniques for improving TxOP truncation by determining whether to update a NAV timing associated with the BSS (Intra-BSS NAV) or a NAV timing associated with an OBSS (Inter-BSS NAV). For example, a STA 115 may determine to update an Intra-BSS NAV after receiving a CF-End message from one of the other STAs 115 in the BSS. A STA 115 may determine to update an Inter-BSS NAV after receiving a CF-End message after receiving a CTS message from an AP 105 associated with an OBSS. In making the determination to update the NAV timing, the STA 115 may compare an RA or TA contained within the CF-End message or CTS message with an RA or a TA associated with an Intra-BSS NAV or an Inter-BSS NAV. In some cases, the STA 115 also may determine to set an initial NAV timing or cancel an already established NAV timing. In some examples, the STA may determine a TxOP period truncation in response to the CF-End message based on the comparisons of the RAs and TAs.

Figure 2:
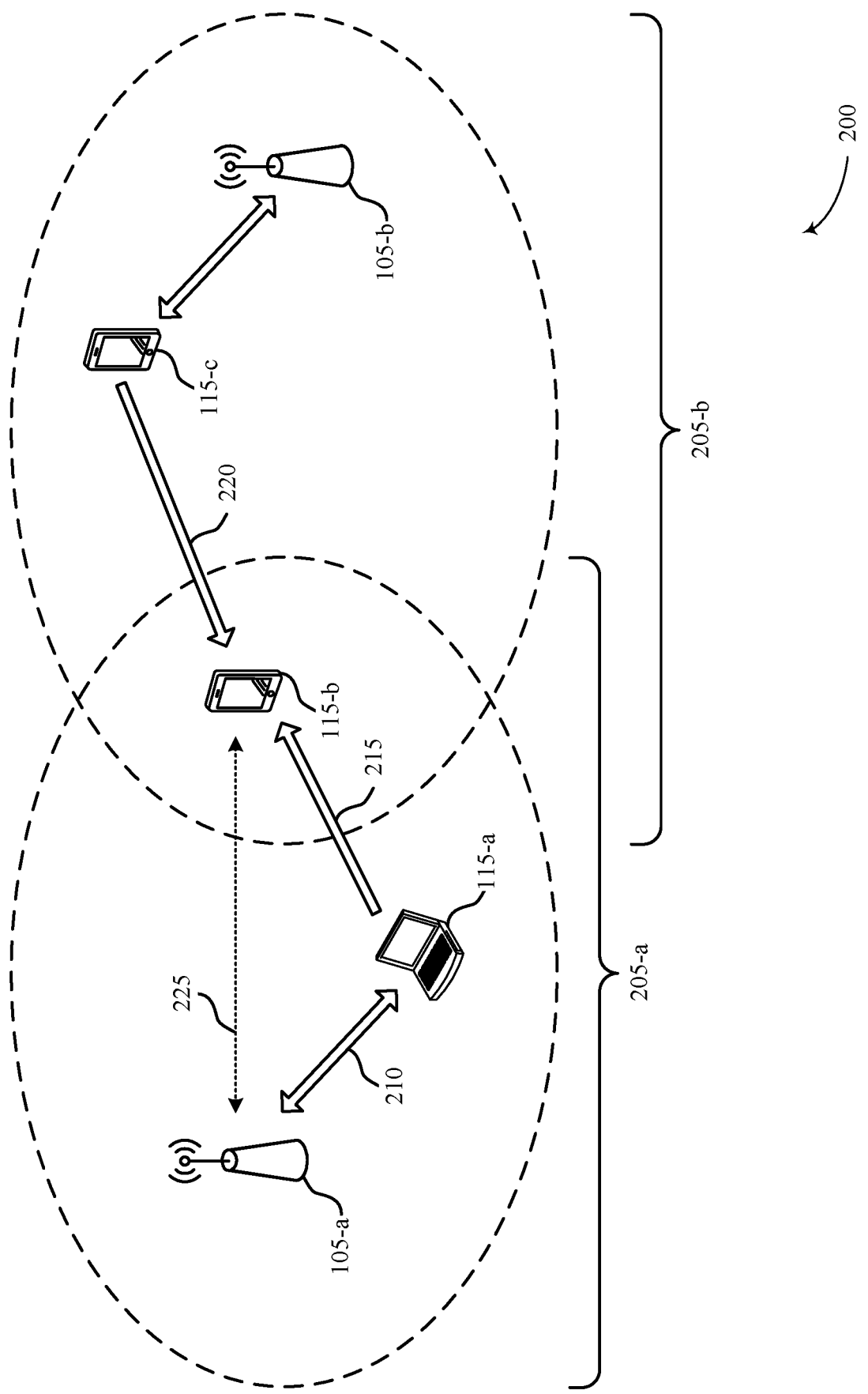
FIG. 2 illustrates an example of a system for wireless communication.

FIG. 2 illustrates an example of a system for wireless communication such as a WLAN 200. The WLAN 200 includes a BSS 205-a showing an AP 105-a in communication with STA 115-a and STA 115-b. The WLAN 200 also includes BSS 205-b showing AP 105-b in communication with STA 115-c. In this example, AP 105-b is not connected to STA 115-b and from the perspective of STA 115-b, BSS 205-b is an OBSS.

In one example, AP 105-a may be in communication with STA 115-a over communication link 210. The STA 115-a also may be transmitting packets to STA 115-b over communication link 215. The STA 115-a may update an Intra-BSS NAV based on packets received by STA 115-a. For example, STA 115-a may transmit data packets that include a duration value indicating how long STA 115-a expects to be occupying communication link 215. Upon reception of each data packet, STA 115-b may update (such as increase or decrease) the Inter-BSS NAV based on the duration value. In some cases, the STA 115-b may set an initial Inter-BSS NAV or cancel an already established Inter-BSS NAV based on one or more received packets.

At some point, STA 115-b may receive a message from STA 115-c over communication link 220. The message may include a CF-End message indicating that STA 115-c will no longer be occupying the medium. In this case, however, STA 115-b may interpret the message from STA 115-c as being sent by STA 115-a and may update the Intra-BSS NAV to 0 (i.e., reset the Intra-BSS NAV). In doing so, STA 115-b may begin transmission (such as by transmitting an RTS packet to AP 105-a) over communication link 225, which may collide with packets from STA 115-a as STA 115-a did not actually indicate a truncation of the TxOP duration.

In another implementation, BSS 205-a may operate using an RTS/CTS in which STAs 115-a and 115-b contend for access to communicate with AP 105-a (or with each other). In this example, after contending for access to communicate with AP 105-a, STA 115-a may obtain a TxOP duration, which may be defined by a TxOP limit. The TxOP limit may be assigned to the STA 115-a by AP 105-a and may be determined based on network conditions such as channel load, number of users, traffic type, etc. During the TxOP duration, the STA 115-a may communicate with AP 105-a (or another device) over communication link 210, which may be assigned to STA 115-a by AP 105-a. At the expiration of the TxOP duration and if the STA 115-a still has data to send or receive, the STA 115-a (along with other devices such as STA 115-b) may perform an RTS/CTS process to gain access to the medium again.

STA 115-b, which did not gain access to communicate with AP 105-a, may wait for an amount of time based on a duration contained within a CTS message, which may transmitted by AP 105-a to STA 115-b using communication link 225. The STA 115-b may set an Intra-BSS NAV or an Inter-BSS NAV, which may be updated as communications within the BSS 205-a or the OBSS 205-b change. While waiting, the STA 115-b may receive a CF-End message from STA 115-c, which is in communication with AP 105-b. Based on the CF-End message, the STA 115-b may determine to update, reset, or cancel one or both of the Intra-BSS NAV or the Inter-BSS NAV and may attempt communication with AP 105-a over communication link 225. This, however, may interfere with communications between AP 105-a and STA 115-a, as neither AP 105-a nor STA 115-a transmitted a CF-End message. Accordingly, to help prevent interference and collisions, STAs 115 or APs 105 may compare RAs or TAs associated with a NAV timing with RAs or TAs within other packets received while waiting for the next contention period. In some examples, the STA 115-b may determine a TxOP period truncation based on a comparison between the RAs or TAs associated with the NAV timing and the RAs or TAs in other packets.

Figure 3A:
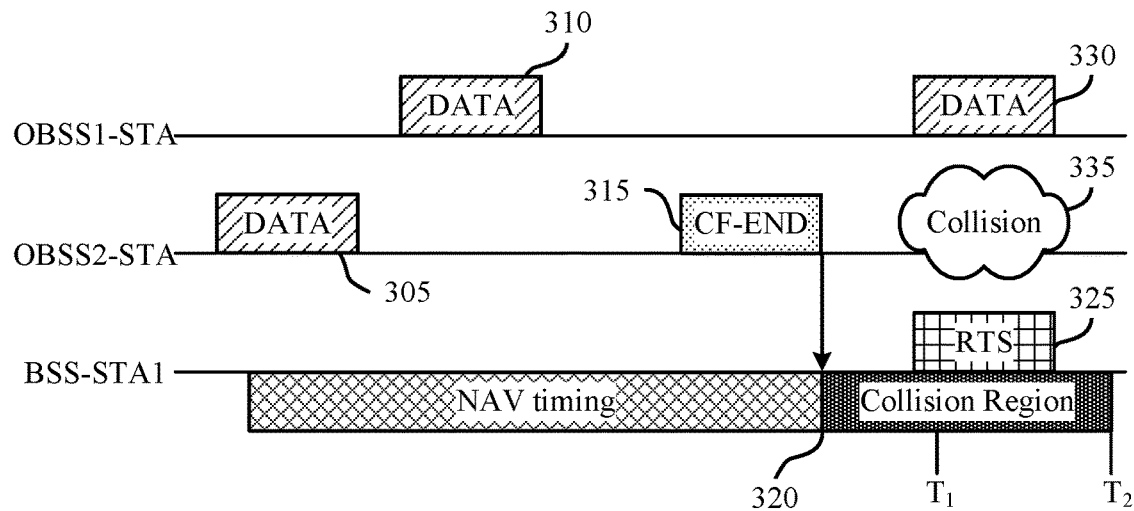
FIGS. 3A and 3B illustrate example timing diagrams for transmission opportunity truncation.
Figure 3B:
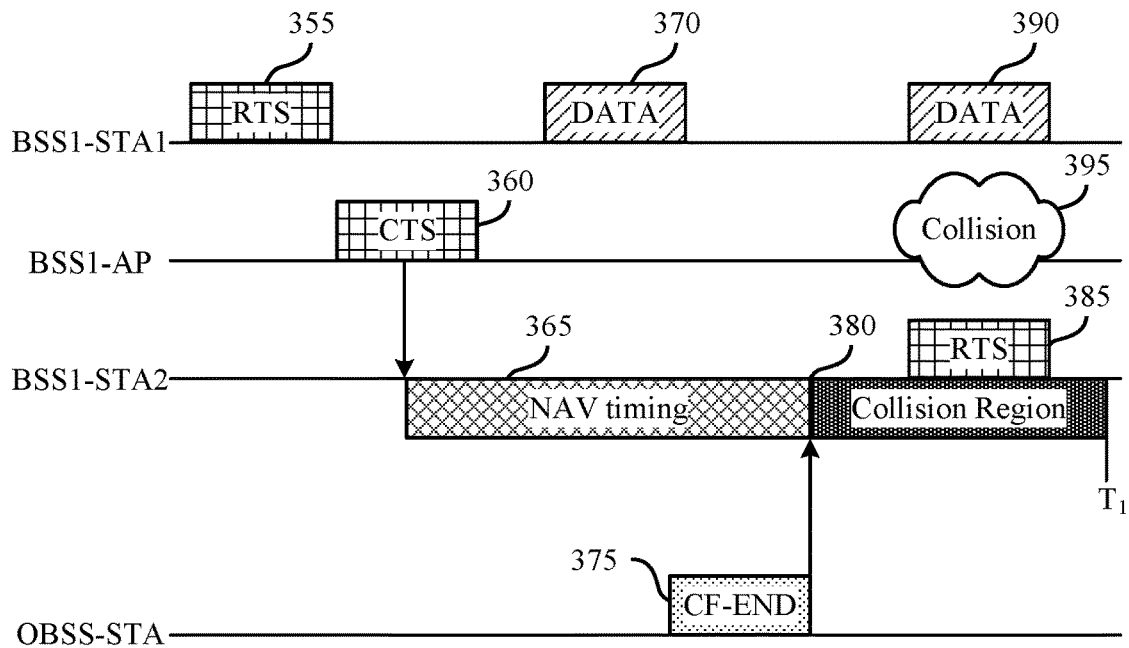

FIGS. 3A and 3B illustrate example timing diagrams for transmission opportunity truncation relating to the scenarios described above with reference to FIG. 1. In the timing diagram 300 of FIG. 3A, OBSS1-STA may be in communication with BSS-STA1 where OBSS1-STA and BSS-STA1 are of different BSSs. The BSS-STA1 also may be in communication with OBSS2-STA, which is part of a BSS different from the BSS of BSS-STA1 and the BSS of OBSS1-STA. Initially, BSS-STA1 may set its NAV timing (such as an Inter-BSS NAV) to time $T_1$, which may have been determined through a CTS message associated with OBSS1-STA, for example. In other words, OBSS1-STA may indicate to BSS-STA1, directly or indirectly, that OBSS1-STA intends to occupy a medium for a time $T_1$. Thereafter, OBSS2-STA may transmit data to BSS-STA1 at 305 indicating that OBSS2-STA intends on occupying a medium for a time $T_2$. Based on this, BSS-STA1 extends its NAV timing to $T_2$. At 310, OBSS1-STA transmits data to BSS-STA1 and OBSS2-STA transmits a CF-End message to BSS-STA1 at 315. Based on the received CF-End message, BSS-STA1 resets its NAV timing from $T_2$ to 0 as BSS-STA1 cannot determine whether the CF-End message came from the STA that that triggered an update of the NAV timing. Accordingly, while OBSS1-STA still has data to transmit through time $T_1$, BSS-STA1 has reset its NAV timing to 0 at 320 and may begin an RTS/CTS process at 325. However, the RTS message sent at 325 may interfere with data being transmitted by OBSS1-STA at 330 which may result in a collision at 335 or possible packet loss.

In the timing diagram 350 of FIG. 3B, BSS1-AP may be in communication with BSS1-STA1 and BSS1-STA2. The BSS1-STA1 may contend for access to a medium by sending an RTS message at 355. At 360, BSS1-AP may send a CTS message to BSS1-STA1 and BSS1-STA2 indicating that BSS1-STA1 has gained access to the medium for a given duration. The duration may be included in the CTS message and may be used by BSS1-STA2 to set the NAV timing 365 (such as Intra-BSS NAV) to time $T_1$. Data may be transmitted by BSS1-STA1 using the medium at 370. At 375, BSS1-STA2 may receive a CF-End message and BSS1-STA2 resets its NAV timing from $T_1$ to 0 as BSS1-STA2 cannot determine whether the CF-End message came from the AP that triggered the update of the NAV timing. Accordingly, while BSS1-STA1 still has data to transmit through time $T_1$, BSS1-STA2 has reset its NAV timing to 0 at 380 and may begin an RTS/CTS process at 385. However, the RTS message sent at 385 may interfere with data being transmitted by BSS1-STA1 at 390 which may result in a collision at 395 or possible packet loss.

To avoid such collisions and possible packet loss, STAs, APs, or other devices within a WLAN may determine whether to update an Inter-BSS NAV or an Intra-BSS NAV based on a RA or a TA associated with a recent NAV update and the RA or TA received in a subsequent message. In some examples, a NAV update history may be stored in a table or other data structure and for each received message having a duration value, the duration value may be associated with a TA or an RA related to that duration value.

For example, a STA may receive a message (such as an RTS message) from a second STA and the message may include a TA, an RA, and a NAV value associated with the TA and the RA. The STA may store the TA, the RA, and the NAV in a list and update an Inter-BSS NAV or an Intra-BSS NAV based on whether the TA or the RA are within the same BSS as the STA or are within an OBSS. The STA may receive multiple messages that include a TA, an RA, and a NAV value associated with the TA and RA. The STA may store each of the associated TA, RA, and NAV values and determine whether to update a NAV timing based on whether the TA or the RA are within the same BSS as the STA or are within an OBSS. For instance, as shown in Table 1 below, a STA may have received 4 messages from that include a TA, an RA, and an associated NAV. The TA, RA, and NAV for each message may be stored in rows where the first row represents a packet corresponding to the most recent message used to update the NAV timing (such as an Inter-BSS NAV or an Intra-BSS NAV). In some examples, a STA may store 2 tables, one for Inter-BSS NAV and one for Intra-BSS NAV and the NAV value may be the maximum value of $NAV_1$, $NAV_2$, $NAV_3$, and $NAV_4$.

When a STA receives a subsequent message, such as a CF-End message, it will check the TA or RA contained within the CF-End message for comparison against each row of the table. If the TA or RA contained within the CF-End message matches any TA or RA in the table, the row is removed and the NAV timing may be updated. If the TA or RA does not match any TA or RA in the table, the STA may determine to do nothing as the received CF-End message was not transmitted by any of the devices in the Table and thus should not be used to update the NAV timing.

TABLE 1

| $TA_1$ | $RA_1$ | $NAV_1$ |
|--------|--------|---------|
| $TA_2$ | $RA_2$ | $NAV_2$ |
| $TA_3$ | $RA_3$ | $NAV_3$ |
| $TA_4$ | $RA_4$ | $NAV_4$ |

In some examples, instead of storing a complete history of NAV values and associated TAs and RAs, a STA may only store the most recent TA, RA, and NAV value used to update the NAV timing. In such cases, if the STA receives a CF-End message, the STA compares the TA or RA of the CF-End message to the TA and RA corresponding to the most recent NAV update and if there is a match, the STA may reset its NAV timing to 0. If there is no match, the STA may determine to do nothing and wait until expiration of the current NAV timing or until another message is received.

Figure 4:
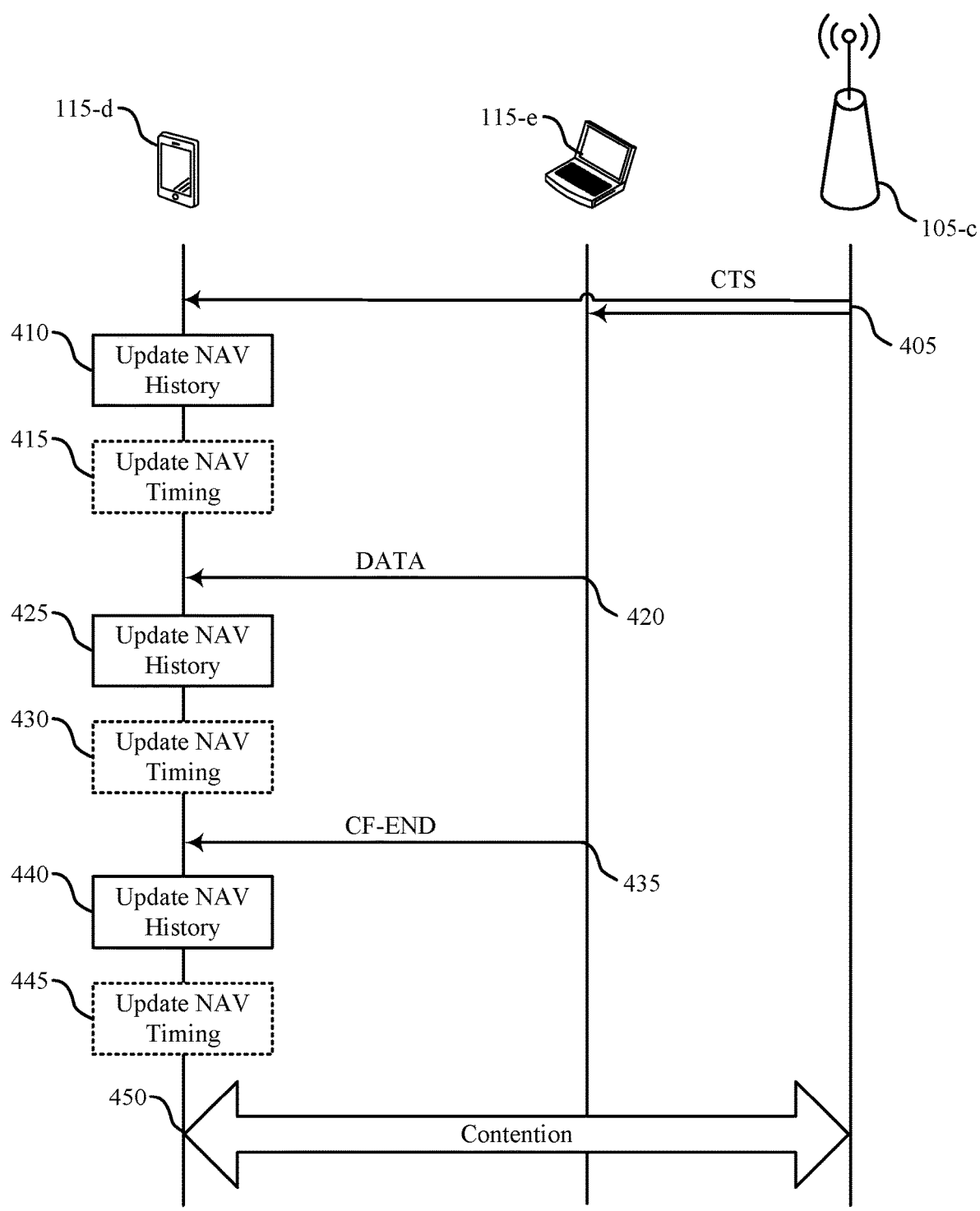
FIGS. 4 and 5 illustrate example process flows that support improving transmission opportunity truncation.

FIG. 4 illustrates an example of a process flow 400 for improving transmission opportunity truncation. In process flow 400, STA 115-e may gain access to a medium and receive a CTS message from AP 105-c at 405. The CTS message may include an RA (the address of STA 115-e which gained access to the medium) and a NAV value. The AP 105-c also may transmit the CTS message to STA 115-d, which may update a NAV history at 410. The NAV history may be updated using a table in which a list of all packets received at STA 115-d that include a TA, an RA, and an associated NAV value are stored. If the TA or RA match a TA or RA in the table, the STA 115-d may update its NAV timing (either an Intra-BSS NAV or Inter-BSS NAV) depending on whether the AP 105-c or the STA 115-e is part of the same BSS as STA 115-d. In some cases, such as when the TA or RA does not match a TA or RA in the stored table, the STA 115-d may choose not to update the NAV timing.

In some examples, at 420, STA 115-e may transmit a data packet to STA 115-d. The data packet may include a TA or an RA and an associated NAV value. At 425, STA 115-d may update the NAV history with the TA, RA, and associated NAV value within the data packet and compare the TA or RA received from STA 115-e to determine whether to update the NAV timing at 430. For example, if the TA or RA of the data packet matches a TA or RA in the table, the STA 115-d may update the NAV timing. At 435, STA 115-e may transmit a CF-End message to STA 115-d indicating that STA 115-e will no longer occupy the medium. At 440, the STA 115-d may update the NAV history and determine whether to update (such as reset) the NAV timing by comparing the TA or RA in the CF-End message with the TAs and RAs in the table. For example, STA 115-d may determine a TxOP period truncation in response to the CF-End message based on the comparison. If the TA or the RA match a TA or RA in the table, the STA 115-d may choose to reset the NAV timing to 0 and contend for access to the medium at 450 based on the updated NAV timing, or the STA 115-d may contend for access to the medium based on the TxOP period truncation.

Figure 5:
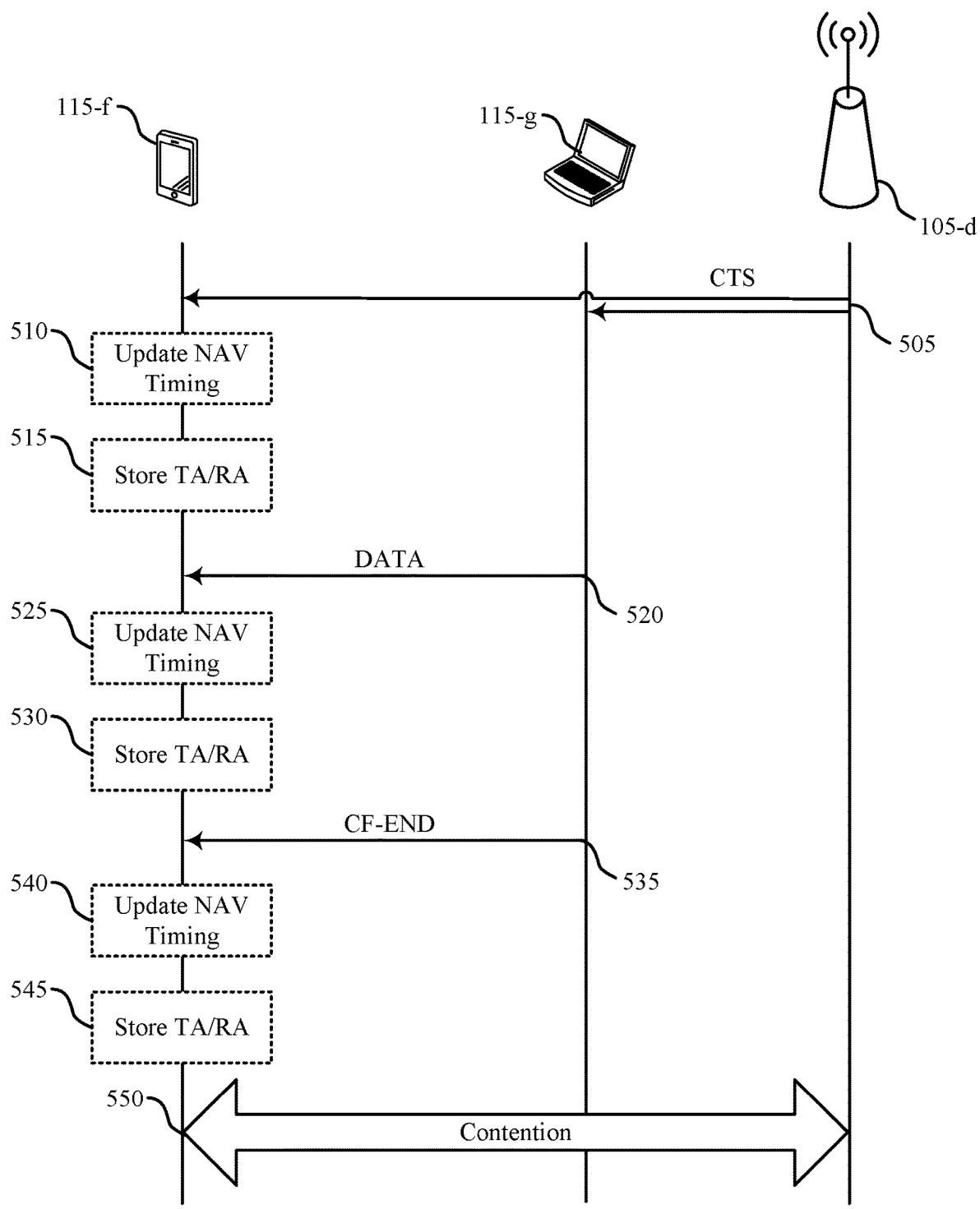

FIG. 5 illustrates an example of a process flow 500 for improving transmission opportunity truncation. In process flow 500, STA 115-g may gain access to a medium and receive a CTS message from AP 105-d at 505. The CTS message may include an RA (the address of STA 115-g which gained access to the medium) and an associated NAV value. The AP 105-d also may transmit the CTS message to STA 115-f, which may update a NAV timing at 510 and store the TA, the RA, and the associated NAV value of the most recent NAV timing update at 515.

In some examples, at 520, STA 115-g may transmit a data packet to STA 115-f. The data packet may include a TA or an RA and an associated NAV value. At 525, STA 115-f may update the NAV timing if the TA or RA of the data packet matches the TA or the RA of the most recent NAV update and may optionally store the TA, RA, and associated NAV value at 530. At 535, STA 115-g may transmit a CF-End message to STA 115-f indicating that STA 115-g will no longer occupy the medium. At 540, the STA 115-f may update the NAV timing by comparing the TA or RA in the CF-End message with the TA and RA of the most recent NAV update. For example, STA 115-f may determine a TxOP period truncation in response to the CF-End message based on the comparison. If the TA or the RA match a TA or RA in the NAV update, the STA 115-f may choose to reset the NAV timing to 0, store the TA and RA of the CF-End message at 545, and contend for access to the medium at 550 based on the updated NAV timing.

Figure 6:
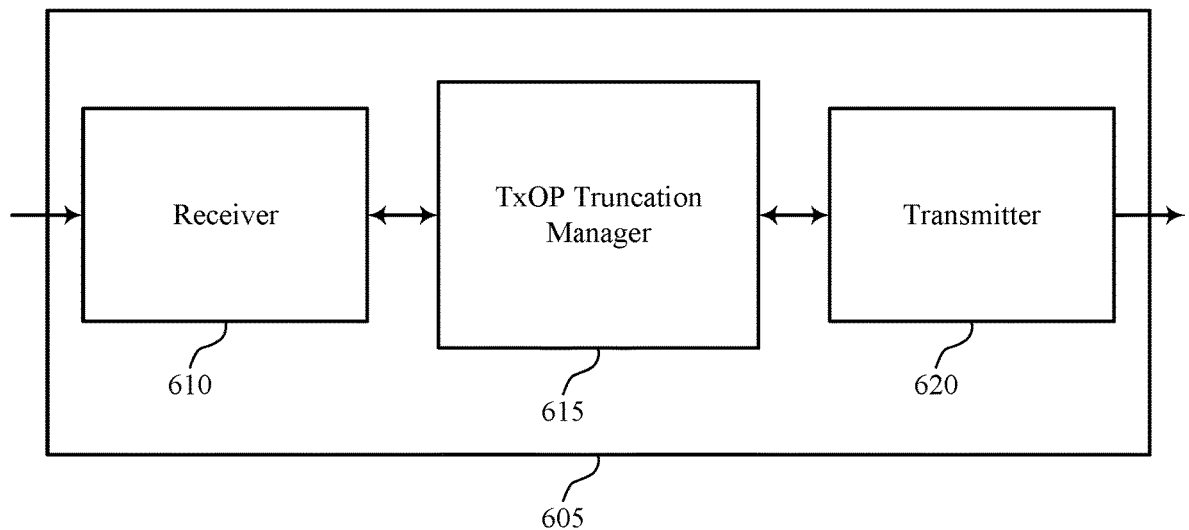
FIGS. 6-8 show block diagrams of an example device that supports improving transmission opportunity truncation.

FIG. 6 shows a block diagram of an example device. The block diagram 600 includes a wireless device 605 that supports improving transmission opportunity truncation in accordance with various aspects of the present disclosure. The wireless device 605 may be an example of aspects of a STA 115 as described with reference to FIG. 1. The wireless device 605 may include a receiver 610, a TxOP truncation manager 615, and a transmitter 620. The wireless device 605 also may include a processor. Each of these components may be in communication with one another (such as via one or more buses).

The receiver 610 may receive information such as packets, user data, or control information associated with various information channels (such as control channels, data channels, and information related to improving transmission opportunity truncation, etc.). Information may be passed on to other components of the device. The receiver 610 may be an example of aspects of the transceiver 935 described with reference to FIG. 9.

The TxOP truncation manager 615 may be an example of aspects of the TxOP truncation manager 915 described with reference to FIG. 9.

The TxOP truncation manager 615 may receive a first message from a first STA at a second STA, the first message including a first NAV, a first TA, and a first RA, receive, at the second station, a second message including a second TA and a second RA, determine whether to update a NAV timing in response to the received second message based on a comparison between the first TA, the second TA, the first RA, and the second RA, and contend for access to a wireless medium based on the NAV timing. In some examples, the second message may be a CF-End frame, and the TxOP truncation manager 615 may determine a TxOP period truncation in response to the CF-End frame based on the comparison between the first TA, the second TA, the first RA, and the second RA. If the TxOP period is truncated, the TxOP truncation manager 615 may contend for access to the wireless medium based on the TxOP period truncation.

The transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or may include a set of antennas.

Figure 7:
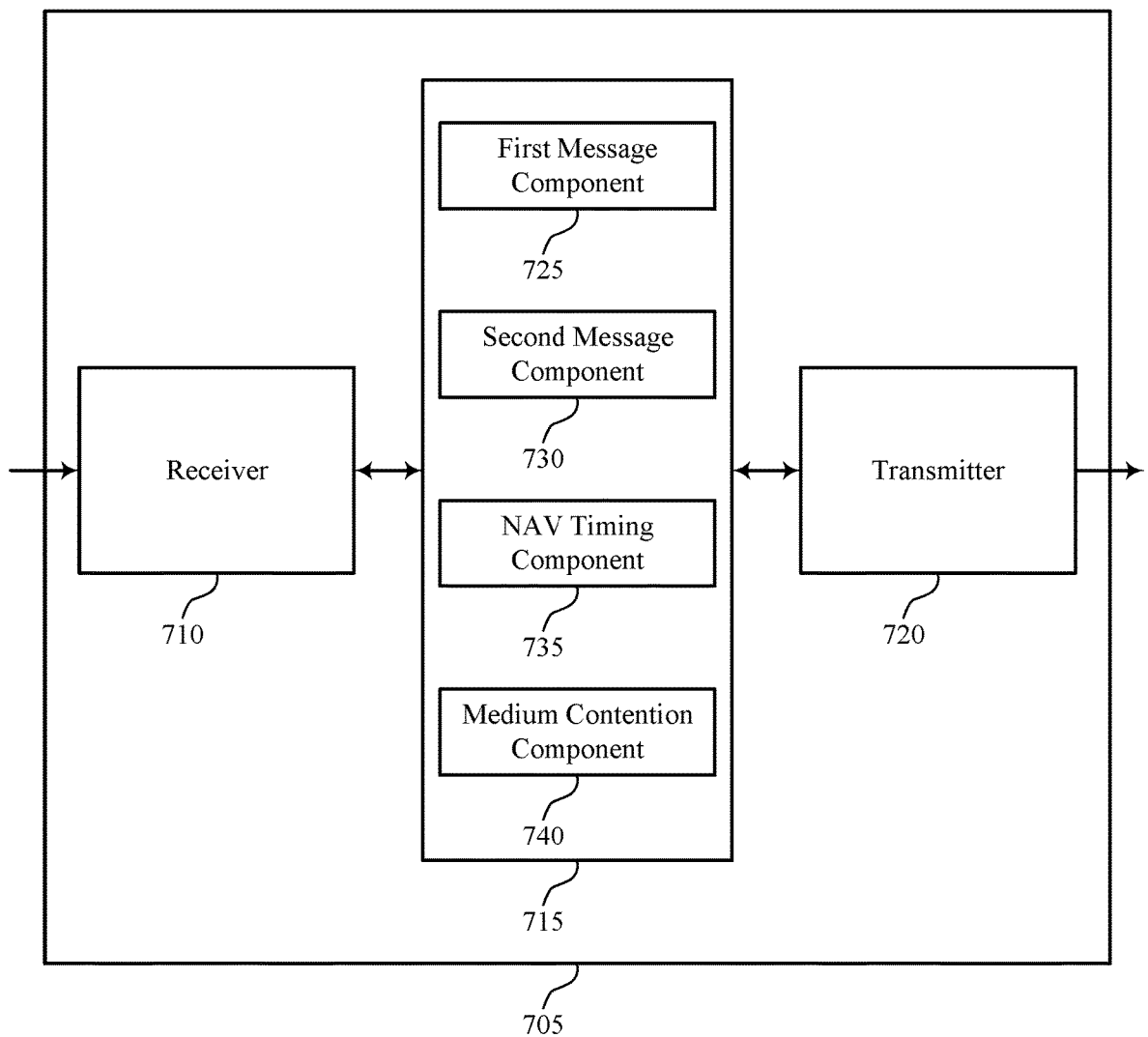

FIG. 7 shows a block diagram of an example device. The block diagram 700 includes a wireless device 705 that supports improving transmission opportunity truncation in accordance with various aspects of the present disclosure. The wireless device 705 may be an example of aspects of a wireless device 605 or a STA 115 as described with reference to FIGS. 1 and 6. The wireless device 705 may include receiver 710, TxOP truncation manager 715, and transmitter 720. The wireless device 705 also may include a processor. Each of these components may be in communication with one another (such as via one or more buses).

The receiver 710 may receive information such as packets, user data, or control information associated with various information channels (such as control channels, data channels, and information related to improving transmission opportunity truncation, etc.). Information may be passed on to other components of the device. The receiver 710 may be an example of aspects of the transceiver 935 described with reference to FIG. 9.

The TxOP truncation manager 715 may be an example of aspects of the TxOP truncation manager 915 described with reference to FIG. 9. The TxOP truncation manager 715 also may include first message component 725, second message component 730, NAV timing component 735, and medium contention component 740.

The first message component 725 may receive a first message from a first STA at a second STA, the first message including a first NAV, a first TA, and a first RA and transmit a CTS message in response to the RTS message. In some cases, the first message includes an RTS message.

The second message component 730 may receive, at the second station, a second message including a second TA and a second RA. In some cases, the second message includes a CF-End message. In some cases, the second message is received from a third station or an access point.

The NAV timing component 735 may determine whether to update a NAV timing in response to the received second message based on a comparison between the first TA, the second TA, the first RA, and the second RA. In some cases, determining whether to update the NAV timing includes: determining to update the NAV timing if the first TA matches the second TA or the second RA. In some cases, determining whether to update the NAV timing includes determining to update the NAV timing if the first RA matches the second TA or the second RA. In some cases, determining whether to update the NAV timing includes determining not to update the NAV timing if the first TA does not match the second TA or the second RA and if the first RA does not match the second TA or the second RA.

In some examples, such as if the second message is a CF-End frame, the NAV timing component 735 may determine a TxOP period truncation in response to the CF-End frame based on the comparison between the first TA, the second TA, the first RA, and the second RA. In some examples, the NAV timing component 735 may determine the TxOP period truncation based on the first TA matching the second TA or second RA, or the first RA matching the second TA or second RA.

The medium contention component 740 may contend for access to a wireless medium based on the NAV timing. For example, if the NAV timing component 735 determines a TxOP period truncation, the medium contention component 740 may contend for access to the wireless medium based on the TxOP period truncation.

The transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
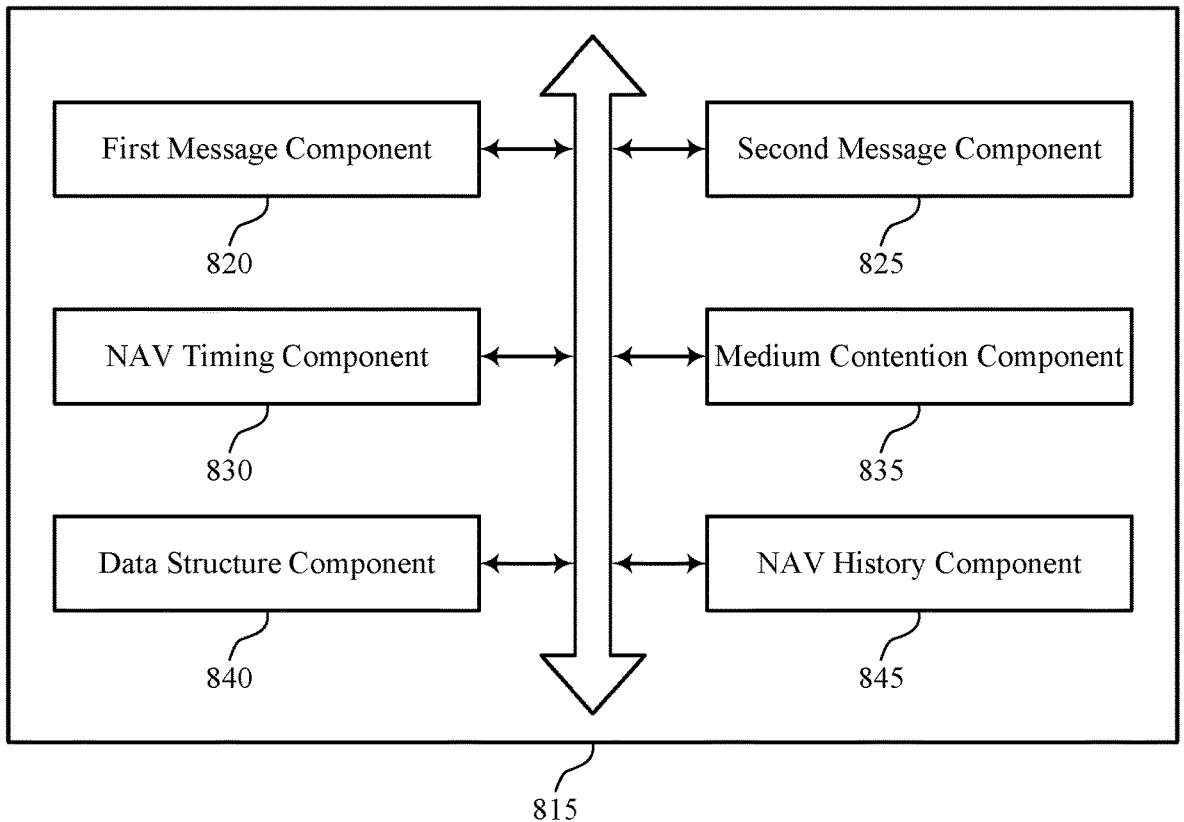

FIG. 8 shows a block diagram of an example device. The block diagram 800 includes a TxOP truncation manager 815 that supports improving transmission opportunity truncation. The TxOP truncation manager 815 may be an example of aspects of a TxOP truncation manager 615, a TxOP truncation manager 715, or a TxOP truncation manager 915 described with reference to FIGS. 6, 7, and 9. The TxOP truncation manager 815 may include first message component 820, second message component 825, NAV timing component 830, medium contention component 835, data structure component 840, and NAV history component 845. Each of these modules may communicate, directly or indirectly, with one another (such as via one or more buses).

The first message component 820 may receive a first message from a first STA at a second STA, the first message including a first NAV, a first TA, and a first RA and transmit a CTS message in response to the RTS message. In some cases, the first message includes an RTS message.

The second message component 825 may receive, at the second station, a second message including a second TA and a second RA. In some cases, the second message includes a CF-End frame. In some cases, the second message is received from a third station or an access point.

The NAV timing component 830 may determine whether to update a NAV timing in response to the received second message based on a comparison between the first TA, the second TA, the first RA, and the second RA. In some cases, determining whether to update the NAV timing includes: determining to update the NAV timing if the first TA matches the second TA or the second RA. In some cases, determining whether to update the NAV timing includes determining to update the NAV timing if the first RA matches the second TA or the second RA. In some cases, determining whether to update the NAV timing includes determining not to update the NAV timing if the first TA does not match the second TA or the second RA and if the first RA does not match the second TA or the second RA.

In some examples, such as if the second message is a CF-End frame, the NAV timing component 830 may determine a TxOP period truncation in response to the CF-End frame based on the comparison between the first TA, the second TA, the first RA, and the second RA. In some examples, the NAV timing component 830 may determine the TxOP period truncation based on the first TA matching the second TA or second RA, or the first RA matching the second TA or second RA.

The medium contention component 835 may contend for access to a wireless medium based on the NAV timing. If the NAV timing component determines to TxOP period truncation, the medium contention component 835 may contend for access to the wireless medium based on the TxOP period truncation.

The data structure component 840 may store, by the second STA, a data structure associating the first NAV with the first TA and the first RA and update the data structure to associate the NAV timing with the first TA and the first RA based on the TxOP period truncation.

The NAV history component 845 may store, by the second STA, a history of NAV timing updates and update the history of NAV timing updates based on the TxOP period truncation.

Figure 9:
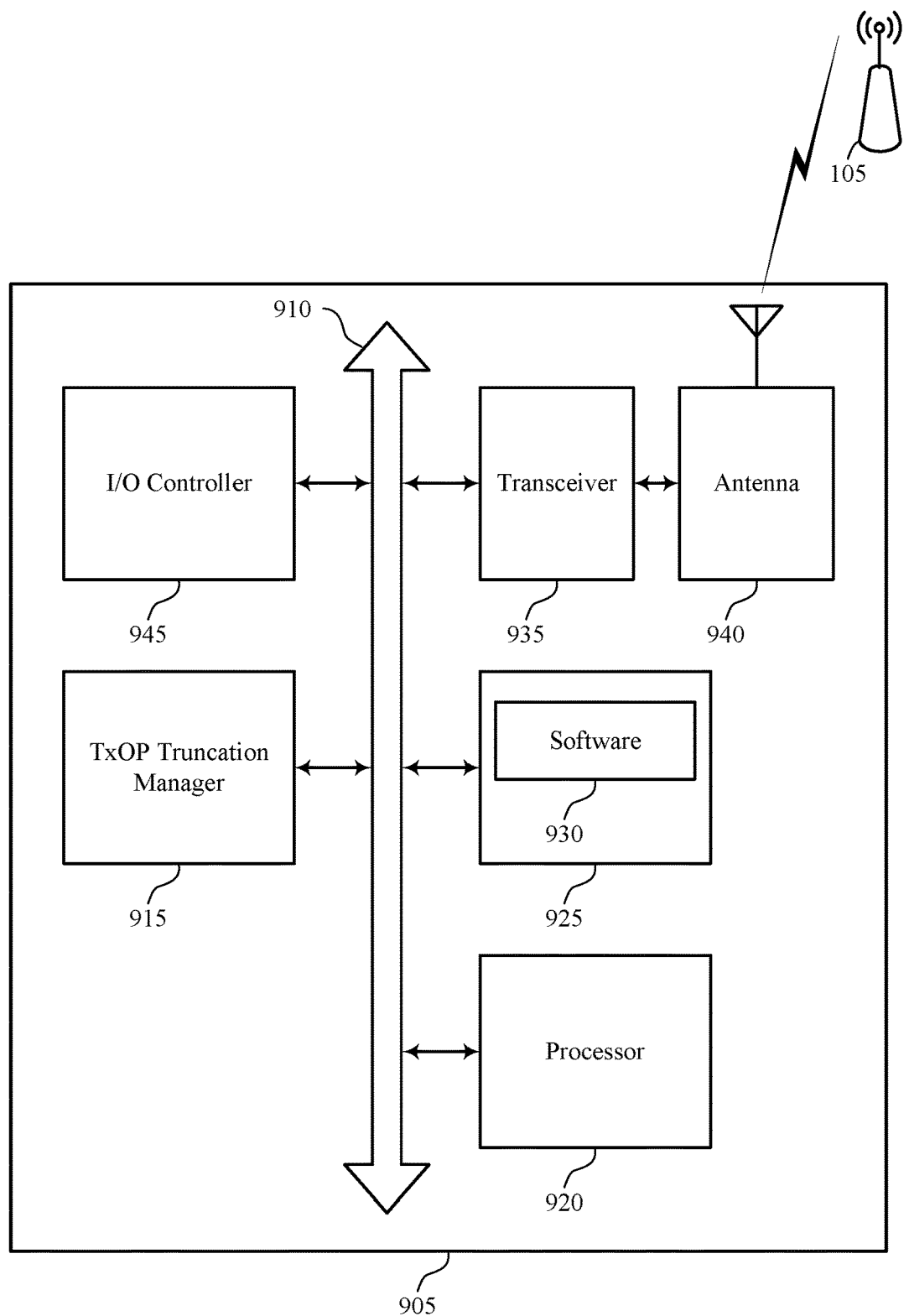
FIG. 9 illustrates a block diagram of an example system including a device that supports improving transmission opportunity truncation.

FIG. 9 shows a block diagram of an example system 900 including a device 905 that supports improving transmission opportunity truncation. The device 905 may be an example of or include the components of wireless device 605, wireless device 705, or a STA 115 as described above, such as with reference to FIGS. 1, 6, and 7. The device 905 may include components for bi-directional voice and data communications including components for transmitting and receiving communications, including a TxOP truncation manager 915, a processor 920, memory 925, software 930, a transceiver 935, an antenna 940, and an I/O controller 945. These components may be in electronic communication via one or more busses (such as bus 910).

The processor 920 may include an intelligent hardware device, (such as a central processing unit (CPU), a microcontroller, an application-specific integrated circuit (ASIC), etc.). In some cases, processor 920 may be configured to operate a memory array using a memory controller. In other cases, a memory controller may be integrated into processor 920.

The memory 925 may include random access memory (RAM) and read only memory (ROM). The memory 925 may store computer-readable, computer-executable software 930 including instructions that, when executed, cause the processor to perform various functions described herein. In some cases, the software 930 may not be directly executable by the processor but may cause a computer (such as when compiled and executed) to perform functions described herein.

The transceiver 935 may communicate bi-directionally, via one or more antennas, wired, or wireless links as described above. For example, the transceiver 935 may represent a wireless transceiver and may communicate bi-directionally with another wireless transceiver. The transceiver 935 also may include a modem to modulate the packets and provide the modulated packets to the antennas for transmission, and to demodulate packets received from the antennas.

In some cases, the wireless device 905 may include a single antenna 940. However, in some cases the wireless device 905 may have more than one antenna 940, which may be capable of concurrently transmitting or receiving multiple wireless transmissions.

Figure 10:
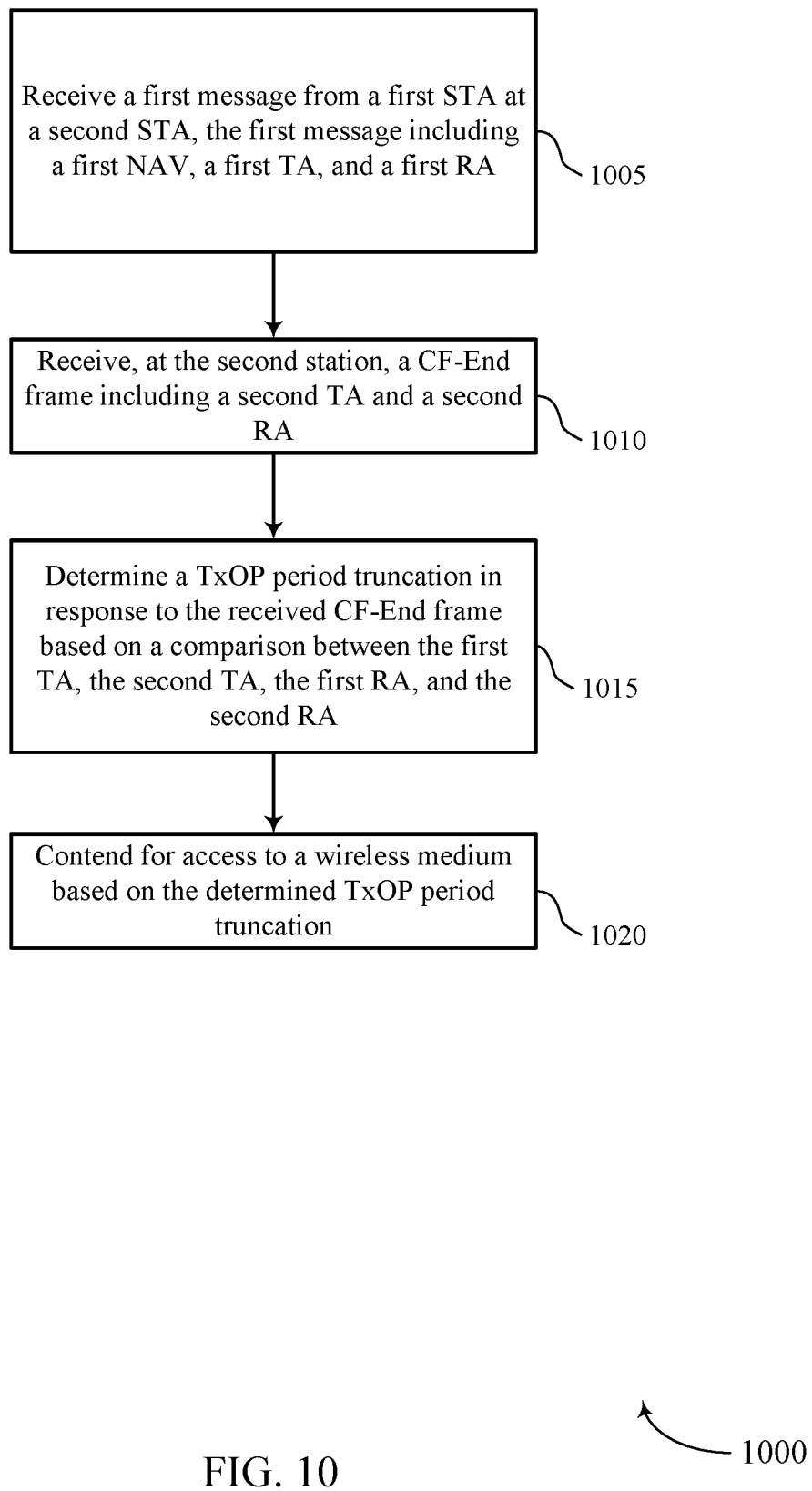
FIGS. 10-12 illustrate methods for improving transmission opportunity truncation.

FIG. 10 shows a flowchart illustrating a method 1000 for improving transmission opportunity truncation. The operations of method 1000 may be implemented by a STA 115 or its components as described herein. For example, the operations of method 1000 may be performed by a TxOP truncation manager as described with reference to FIGS. 6-9. In some examples, a STA 115 may execute a set of codes to control the functional elements of the device to perform the functions described below. Additionally, or alternatively, the STA 115 may perform aspects the functions described below using special-purpose hardware.

At block 1005 the STA 115 may receive a first message from a first STA 115, the first message including a first NAV, a first TA, and a first RA. The operations of block 1005 may be performed according to the methods described with reference to FIGS. 1-5. In some implementations, aspects of the operations of block 1005 may be performed by a first message component as described with reference to FIGS. 6-9.

At block 1010, the STA 115 may receive a CF-End frame including a second TA and a second RA. The operations of block 1010 may be performed according to the methods described with reference to FIGS. 1-5. In some implementations, aspects of the operations of block 1010 may be performed by a second message component as described with reference to FIGS. 6-9.

At block 1015, the STA 115 may determine a TxOP period truncation in response to the received CF-End frame based at least in part on a comparison between the first TA, the second TA, the first RA, and the second RA. The operations of block 1015 may be performed according to the methods described with reference to FIGS. 1-5. In some implementations, aspects of the operations of block 1015 may be performed by a NAV timing component as described with reference to FIGS. 6-9.

At block 1020, the STA 115 may contend for access to a wireless medium based at least in part on the determined TxOP period truncation. The operations of block 1020 may be performed according to the methods described with reference to FIGS. 1-5. In some implementations, aspects of the operations of block 1020 may be performed by a medium contention component as described with reference to FIGS. 6-9.

Figure 11:
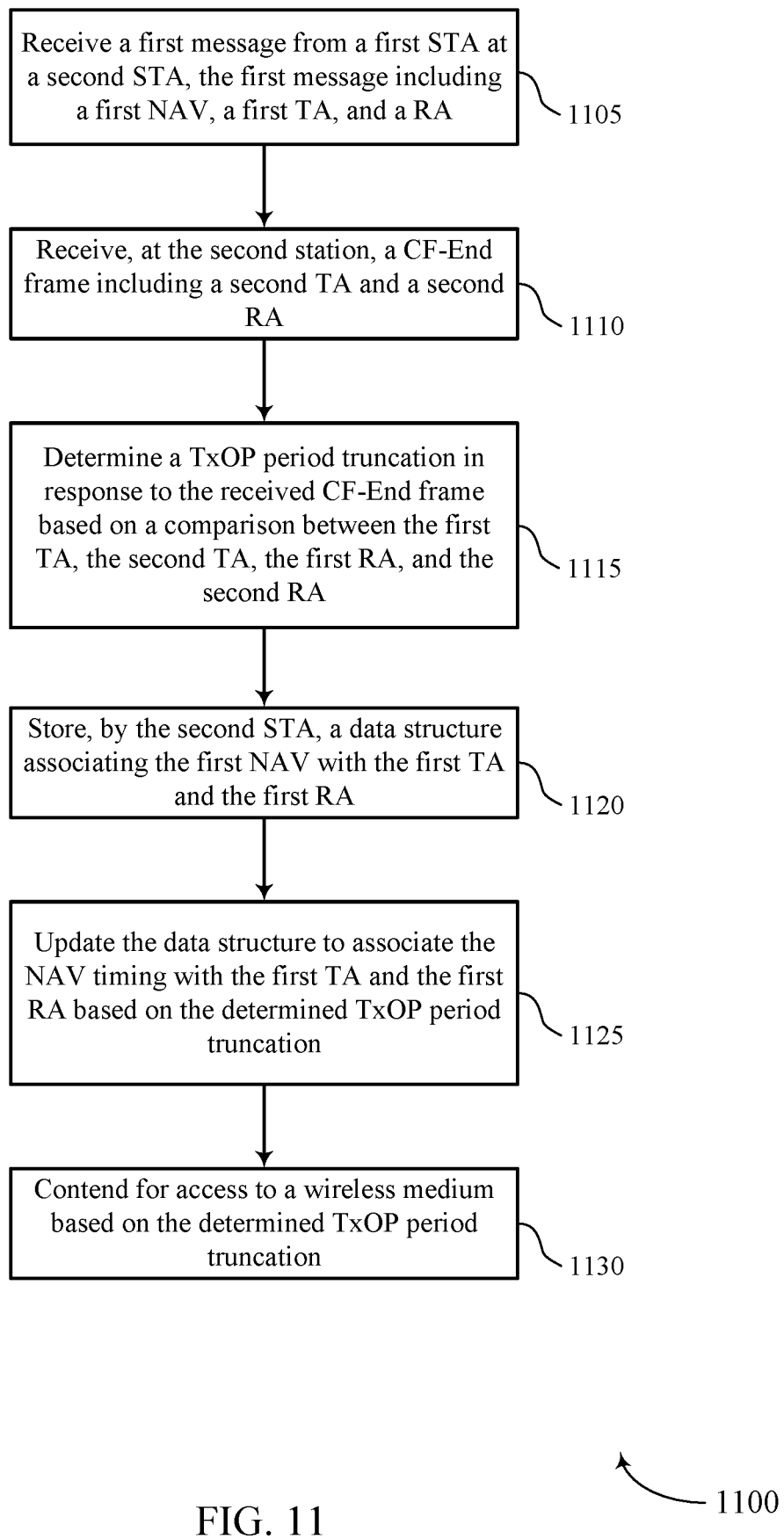

FIG. 11 shows a flowchart illustrating a method 1100 for improving transmission opportunity truncation. The operations of method 1100 may be implemented by a STA 115 or its components as described herein. For example, the operations of method 1100 may be performed by a TxOP truncation manager as described with reference to FIGS. 6-9. In some examples, a STA 115 may execute a set of codes to control the functional elements of the device to perform the functions described below. Additionally, or alternatively, the STA 115 may perform aspects the functions described below using special-purpose hardware.

At block 1105, the STA 115 may receive a first message from a first STA 115, the first message including a first NAV, a first TA, and a first RA. The operations of block 1105 may be performed according to the methods described with reference to FIGS. 1-5. In some implementations, aspects of the operations of block 1105 may be performed by a first message component as described with reference to FIGS. 6-9.

At block 1110, the STA 115 may receive, at the second station, a CF-End frame including a second TA and a second RA. The operations of block 1110 may be performed according to the methods described with reference to FIGS. 1-5. In some implementations, aspects of the operations of block 1110 may be performed by a second message component as described with reference to FIGS. 6-9.

At block 1115, the STA 115 may determine a TxOP period truncation in response to the CF-End frame based at least in part on a comparison between the first TA, the second TA, the first RA, and the second RA. The operations of block 1115 may be performed according to the methods described with reference to FIGS. 1-5. In some implementations, aspects of the operations of block 1115 may be performed by a NAV timing component as described with reference to FIGS. 6-9.

At block 1120, the STA 115 may store, by the second STA, a data structure associating the first NAV with the first TA and the first RA. In some examples, the STA 115 may contend for access to the wireless medium based at least in part on the TxOP period truncation. The operations of block 1120 may be performed according to the methods described with reference to FIGS. 1-5. In some implementations, aspects of the operations of block 1120 may be performed by a data structure component as described with reference to FIGS. 6-9.

At block 1125, the STA 115 may update the data structure to associate the NAV timing with the first TA and the first RA based at least in part on the determined TxOP period truncation. The operations of block 1125 may be performed according to the methods described with reference to FIGS. 1-5. In some implementations, aspects of the operations of block 1125 may be performed by a data structure component as described with reference to FIGS. 6-9.

At block 1130, the STA 115 may contend for access to a wireless medium based at least in part on the determined TxOP period truncation. The operations of block 1130 may be performed according to the methods described with reference to FIGS. 1-5. In some implementations, aspects of the operations of block 1130 may be performed by a medium contention component as described with reference to FIGS. 6-9.

Figure 12:
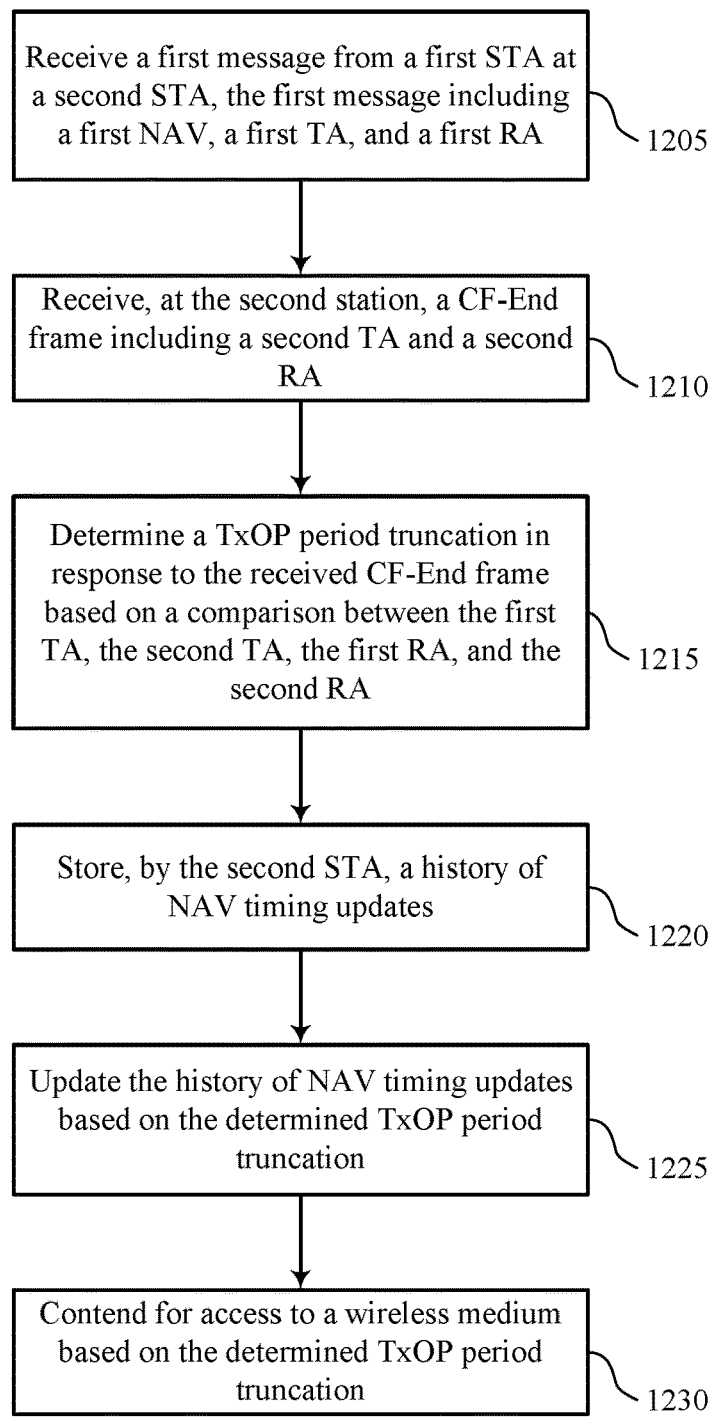

FIG. 12 shows a flowchart illustrating a method 1200 for improving transmission opportunity truncation. The operations of method 1200 may be implemented by a STA 115 or its components as described herein. For example, the operations of method 1200 may be performed by a TxOP truncation manager as described with reference to FIGS. 6-9. In some examples, a STA 115 may execute a set of codes to control the functional elements of the device to perform the functions described below. Additionally, or alternatively, the STA 115 may perform aspects the functions described below using special-purpose hardware.

At block 1205, the STA 115 may receive a first message from a STA 115, the first message including a first NAV, a first TA, and a first RA. The operations of block 1205 may be performed according to the methods described with reference to FIGS. 1-5. In some implementations, aspects of the operations of block 1205 may be performed by a first message component as described with reference to FIGS. 6-9.

At block 1210, the STA 115 may receive a CF-End frame including a second TA and a second RA. The operations of block 1210 may be performed according to the methods described with reference to FIGS. 1-5. In some implementations, aspects of the operations of block 1210 may be performed by a second message component as described with reference to FIGS. 6-9.

At block 1215, the STA 115 may determine a TxOP period truncation in response to the CT-Free End frame based at least in part on the comparison between the first TA, the second TA, the first RA, and the second RA. The operations of block 1215 may be performed according to the methods described with reference to FIGS. 1-5. In some implementations, aspects of the operations of block 1215 may be performed by a NAV timing component as described with reference to FIGS. 6-9.

At block 1220, the STA 115 may store, by the second STA, a history of NAV timing updates. The operations of block 1220 may be performed according to the methods described with reference to FIGS. 1-5. In some implementations, aspects of the operations of block 1220 may be performed by a NAV history component as described with reference to FIGS. 6-9.

At block 1225, the STA 115 may update the history of NAV timing updates based at least in part on the determined TxOP period truncation. The operations of block 1225 may be performed according to the methods described with reference to FIGS. 1-5. In some implementations, aspects of the operations of block 1225 may be performed by a NAV history component as described with reference to FIGS. 6-9.

At block 1230, the STA 115 may contend for access to a wireless medium based at least in part on the TxOP period truncation. The operations of block 1230 may be performed according to the methods described with reference to FIGS. 1-5. In some implementations, aspects of the operations of block 1230 may be performed by a medium contention component as described with reference to FIGS. 6-9.

It is noted that the methods described above describe possible implementations, and that the operations and the steps may be rearranged or otherwise modified and that other implementations are possible. Further, aspects from two or more of the methods may be combined.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein also may be called forward link transmissions while the uplink transmissions also may be called reverse link transmissions. Each communication link described herein—including, for example, wireless communications system 100 and 200 of FIGS. 1 and 2—may include one or more carriers, where each carrier may be a signal made up of multiple sub-carriers (such as waveform signals of different frequencies).

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general-purpose single- or multi-chip processor, a DSP, an ASIC, an FPGA or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, e.g., a combination of a DSP and a microprocessor, multiple microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, electrically erasable programmable read only memory (EEPROM), compact disc (CD)-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes CD, laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for wireless communication, comprising:
a processor;
memory in electronic communication with the processor; and
instructions stored in the memory and operable, when executed by the processor, to cause the apparatus to:
receive a first message from a first station (STA) at a second STA, the first message comprising a first network allocation vector (NAV), a first transmitter address (TA), and a first receiver address (RA);
receive, at the second STA, a contention-free end (CF-End) frame comprising a second TA and a second RA;
determine to truncate a transmit opportunity (TxOP) period in response to the received CF-End frame based at least in part on the received first RA matching the received second TA or the received second RA; and
contend for access to a wireless medium based at least in part on the determined truncated TxOP period.

2. The apparatus of claim 1, wherein the instructions are further executable by the processor to:
store, by the second STA, a data structure associating the first NAV with the first TA and the first RA; and
update the data structure to associate a NAV timing with the first TA and the first RA based at least in part on the determined truncated TxOP period.

3. The apparatus of claim 1, wherein the instructions are further executable by the processor to:
store, by the second STA, a history of NAV timing updates; and
update the history of NAV timing updates based at least in part on the determined truncated TxOP period.

4. The apparatus of claim 1, wherein the instructions to determine the truncated TxOP period are based at least in part on the first TA matching the second TA or the second RA.

5. The apparatus of claim 1, wherein the first message comprises a request to send (RTS) message.

6. The apparatus of claim 5, wherein the instructions are further executable by the processor to:
transmit a clear to send (CTS) message in response to the RTS message.

7. The apparatus of claim 1, wherein the CF-End frame is received from a third station or an access point.

8. A method for wireless communication, comprising:
receiving a first message from a first station (STA) at a second STA, the first message comprising a first network allocation vector (NAV), a first transmitter address (TA), and a first receiver address (RA);
receiving, at the second STA, a contention-free end (CF-End) frame comprising a second TA and a second RA;
determining a transmit opportunity (TxOP) period truncation in response to the received CF-End frame based at least in part on the received first RA matching the received second TA or the second RA; and
contending for access to a wireless medium based at least in part on the determined truncated TxOP period.

9. The method of claim 8, further comprising:
storing, by the second STA, a data structure associating the first NAV with the first TA and the first RA; and
updating the data structure to associate a NAV timing with the first TA and the first RA based at least in part on the determined truncated TxOP period.

10. The method of claim 8, further comprising:
storing, by the second STA, a history of NAV timing updates; and
updating the history of NAV timing updates based at least in part on the determined truncated TxOP period.

11. The method of claim 8, wherein the determining is based at least in part on the first TA matching the second TA or the second RA.

12. The method of claim 8, wherein the first message comprises a request to send (RTS) message.

13. The method of claim 12, further comprising:
transmitting a clear to send (CTS) message in response to the RTS message.

14. The method of claim 8, wherein the CF-End frame is received from a third station or an access point.

15. An apparatus for wireless communication, comprising:
means for receiving a first message from a first station (STA) at a second STA, the first message comprising a first network allocation vector (NAV), a first transmitter address (TA), and a first receiver address (RA);
means for receiving, at the second STA, a contention-free end (CF-End) frame comprising a second TA and a second RA;
means for determining a transmit opportunity (TxOP) period truncation in response to the received CF-End frame based at least in part on the received first RA matching the received second TA or the received second RA; and
means for contending for access to a wireless medium based at least in part on the determined truncated TxOP period.

16. The apparatus of claim 15, further comprising:
means for storing, by the second STA, a data structure associating the first NAV with the first TA and the first RA; and
means for updating the data structure to associate a NAV timing with the first TA and the first RA based at least in part on the determined truncated TxOP period.

17. The apparatus of claim 15, further comprising:
means for storing, by the second STA, a history of NAV timing updates; and
means for updating the history of NAV timing updates based at least in part on the determined truncated TxOP period.

18. The apparatus of claim 15, wherein the means for determining is operable based at least in part on the first TA matching the second TA or the second RA.

19. The apparatus of claim 15, wherein the first message comprises a request to send (RTS) message.

20. The apparatus of claim 19, further comprising:
means for transmitting a clear to send (CTS) message in response to the RTS message.

21. The apparatus of claim 15, wherein the CF-End frame is received from a third station or an access point.

22. A non-transitory computer readable medium storing code for wireless communication, the code comprising instructions executable by a processor to:
receive a first message from a first station (STA) at a second STA, the first message comprising a first network allocation vector (NAV), a first transmitter address (TA), and a first receiver address (RA);
receive, at the second STA, a contention-free end (CF-End) frame comprising a second TA and a second RA;
determine a transmit opportunity (TxOP) period truncation in response to the received CF-End frame based at least in part on the received first RA matching the received second TA or the received second RA; and
contend for access to a wireless medium based at least in part on the determined truncated TxOP period.

23. The non-transitory computer-readable medium of claim 22, wherein the instructions are further executable by the processor to:
store, by the second STA, a data structure associating the first NAV with the first TA and the first RA; and
update the data structure to associate a NAV timing with the first TA and the first RA based at least in part on the determined truncated TxOP period.

24. The non-transitory computer-readable medium of claim 22, wherein the instructions are further executable by the processor to:
store, by the second STA, a history of NAV timing updates; and
update the history of NAV timing updates based at least in part on the determined truncated TxOP period.

25. The non-transitory computer-readable medium of claim 22, wherein the instructions executable by the processor to determine the truncated TxOP period are based at least in part on the first TA matching the second TA or the second RA.

26. The non-transitory computer-readable medium of claim 22, wherein the first message comprises a request to send (RTS) message.

* * * * *